United States Patent
Lee et al.

[11] Patent Number: 6,122,319
[45] Date of Patent: Sep. 19, 2000

[54] MOTION COMPENSATING APPARATUS USING GRADIENT PATTERN MATCHING AND METHOD THEREOF

[75] Inventors: Gun-hee Lee, Suwon; Sung-jea Ko, Seoul, both of Rep. of Korea

[73] Assignee: Samsung Electronics Co., Ltd., Kyungki-do, Rep. of Korea

[21] Appl. No.: 09/169,013

[22] Filed: Oct. 9, 1998

[30] Foreign Application Priority Data

Oct. 10, 1997 [KR] Rep. of Korea ................. 97-52121

[51] Int. Cl.[7] ......................................... H04N 7/12
[52] U.S. Cl. .................. 375/240; 348/699; 348/416; 348/208
[58] Field of Search ..................... 348/699, 416, 348/208, 207, 420; 382/237; 375/240; 386/109, 111; 358/426, 461.2, 461.3

[56] References Cited

U.S. PATENT DOCUMENTS

| | | | |
|---|---|---|---|
| 5,157,732 | 10/1992 | Ishii et al. | 348/208 |
| 5,563,652 | 10/1996 | Toba et al. | 348/208 |
| 5,648,815 | 7/1997 | Ioga | 348/208 |
| 5,734,441 | 3/1998 | Kondo et al. | 348/208 |
| 5,734,933 | 3/1998 | Sekine et al. | 348/208 |
| 5,812,197 | 9/1998 | Chan et al. | 348/699 |
| 5,844,630 | 12/1998 | Yamauchi | 348/699 |
| 5,861,916 | 1/1999 | Sekine et al. | 348/208 |
| 5,909,242 | 6/1999 | Kobayashi et al. | 348/208 |
| 5,946,041 | 8/1999 | Morita | 348/416 |

FOREIGN PATENT DOCUMENTS

| | | | |
|---|---|---|---|
| 2 315 946 | 2/1998 | United Kingdom | H04N 5/14 |
| 90/01744 | 2/1990 | WIPO | G06F 15/336 |

*Primary Examiner*—Vu Le
*Attorney, Agent, or Firm*—Sughrue, Mion, Zinn, Macpeak & Seas, PLLC

[57] ABSTRACT

An apparatus and method for detecting a motion vector by converting an input image into gradient pattern information and comparing gradient pattern information in a motion detection area of a current field with representative pattern information of a previous field. A gradient pattern converter converts a gray level of each pixel in a motion detection area in an input image into a gradient bit pattern by comparing differences between the gray level of the pixel and gray levels of its adjacent pixels with an arbitrary threshold value. A motion vector detector forms a search area sequentially in the motion detection area, compares a gradient bit pattern of the search area with a representative bit pattern of a previous image to calculate and accumulate correlation values, and determines a difference of coordinates of a search area which results in a maximum correlation value and coordinates of the representative bit pattern as a motion vector.

9 Claims, 5 Drawing Sheets

S(i−1,j−1)

S(i,j−1)

S(i+1,j−1)

S(i−1,j)

S(i,j)

s(i+1,j)

S(i−1,j+1)

s(i,j+1)

s(i+1,j+1)

MOTION COMPENSATING APPARATUS USING GRADIENT PATTERN MATCHING AND METHOD THEREOF

BACKGROUND OF THE INVENTION

1. Field of the Invention

The present invention relates to a video recording system, and more particularly, to an apparatus and method for compensating for the motion of the video recording system.

2. Description of the Related Art

When photographing an object using an image recording system, e.g. a camcoder, it is difficult to stably photograph the object without trembling of the hands. Such hand trembling may be serious when the image capturing system is small and light so that the user photographs with only one hand. Furthermore, as the magnification of the zoom lens of the camcoder increases, a photographed image is more seriously shaken by a minute movement of the camcoder.

In order to stabilize the captured image, a system controller of the video camera detects a local motion vector of an input video signal, estimates motion due to the trembling of the hands among the detected motion vectors, and determines the motion of the image for compensating the motion of the camera. Typically, conventional motion vector detecting methods employ the band extract representative points (BERP) technique or the edge-pattern matching technique.

In a motion detecting method using the BERP technique, a predetermined number of representative points are set in a motion detecting area. The representative points are passed through a bandpass filter to extract characteristic points. Then, the motion of the image is detected by use of the characteristic points. However, this method has drawbacks in that a filter is to be used to extract characteristic points and the required memory capacity may be increased.

A motion detecting method using the edge pattern matching technique detects motion of the image by converting the edge signal of an image into a binary image signal. Such a method can be implemented by a simple hardware and reduces the required memory capacity by extracting edge patterns from the image, and thus may overcome the problems of the method using BERP. However, according to this method, the detecting precision may be lowered when the illumination is low. Furthermore, it is difficult to detect the edge from the image.

Therefore, a motion detecting method which can reduce the required memory capacity, while maintaining the degree of precision in motion detection, is required.

SUMMARY OF THE INVENTION

In order to solve the above problems, one object of the present invention is to provide an apparatus for detecting a motion vector by converting an input image into gradient pattern information and comparing gradient pattern information in a motion detection area of a current field with representative pattern information of a previous field.

Another object of the present invention is to provide a method for detecting a motion vector by converting an input image into gradient pattern information and comparing gradient pattern information in a motion detection area of a current field with representative pattern information of a previous field.

To achieve one of the above objects, an apparatus according to the present invention is provided for detecting a motion of an image. In this apparatus, a gradient pattern converter converts a gray level of each pixel in a motion detection area in an input image into a gradient bit pattern by comparing differences between the gray level of the pixel and gray levels of its adjacent pixels with an arbitrarily chosen threshold value. A motion vector detector forms a search area sequentially in the motion detection area, compares a gradient bit pattern of the search area with a representative bit pattern of a previous image to calculate and accumulate correlation values, and determines a difference of coordinates of a search area which results in a maximum correlation value and coordinates of the representative bit pattern as a motion vector.

To achieve another one of the above objects, a method for detecting a motion of an image is provided. The method according to the present invention includes the steps of:

(a) setting a motion detection area in an input image;

(b) comparing a gray level of each pixel in the motion detection area with gray levels of its adjacent pixels to extract a gradient bit pattern;

(c) performing bit pattern matching between a bit pattern of a current image and a representative bit pattern of a previous image to obtain a correlation value in a unit of a predetermined search area which has the same shape and magnitude of the representative bit pattern; and determining a difference of coordinates of a search area which results in a maximum correlation value and coordinates of the representative bit pattern as a motion vector.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENTS

Figure 1:
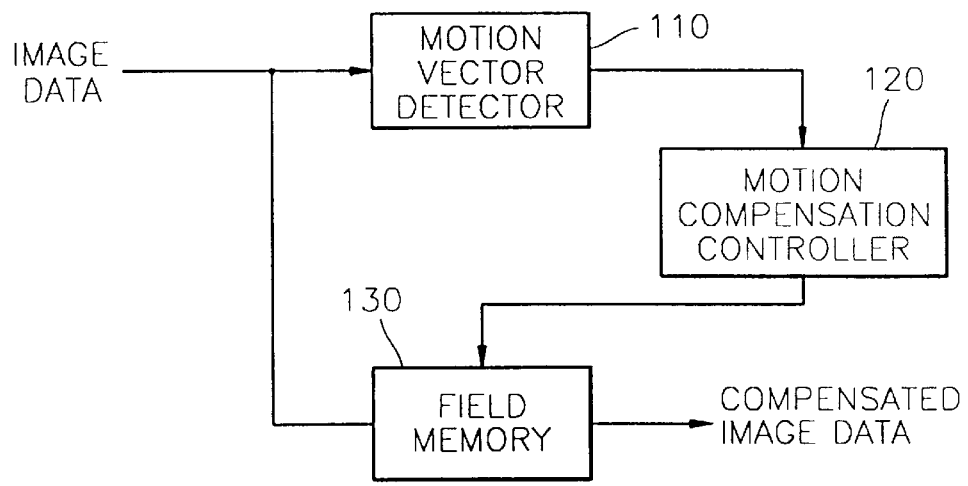
FIG. 1 is a block diagram of a motion correcting apparatus according to the present invention.

Referring to FIG. 1, a motion compensating apparatus includes a motion vector detector 110 for detecting a motion vector from an input video data, a motion compensation controller 120 for receiving the motion vector output by the motion vector detector 110 and generating memory control signals according to the motion vector, and a field memory 130 for storing input image data in a field unit and outputting motion-compensated image data in response to the memory control signals.

Digital image data is input to the motion vector detector 110 as well as the field memory 130. The motion vector detector 110 detects the motion vector using gradient values of pixels in certain motion vector detection areas which is set in a field. That is, in the present invention, input image data is converted into gradient pattern information and the motion vector is detected by use of only gradient pattern information, so that the memory capacity and the calculation amount is reduced.

The motion compensation controller 120 generates memory control signals for reading image data from the field memory 130 based on the motion vector detected by the motion vector detector 110. The field memory 130 outputs motion-compensated image data in a field unit in response to the memory control signals from the motion compensation controller 120.

Figure 2:
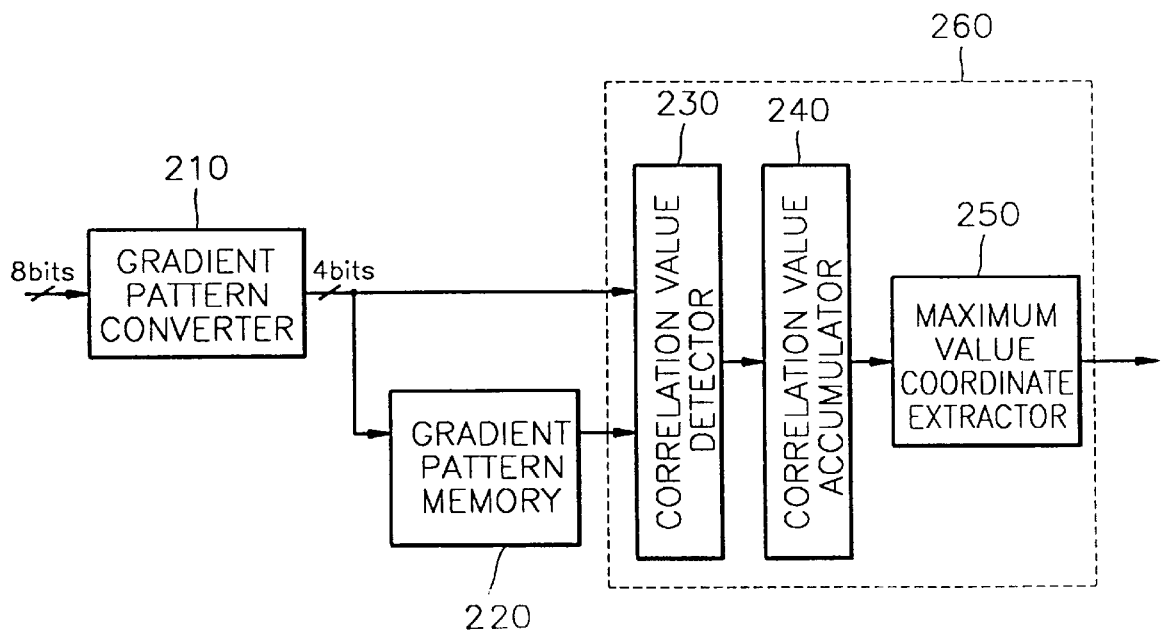
FIG. 2 is a detailed block diagram of the motion vector detector of FIG. 1.

FIG. 2 is a detailed block diagram of the motion vector detector 110. The motion vector detector 110 includes a gradient pattern converter 210, a gradient representative pattern memory 220, and a motion vector determining unit 260. The motion vector determining portion 260 includes of a correlation value detector 230, a correlation value accumulator 240, and a maximum value coordinate extractor 250. The gradient pattern converter 210 receives image data of pixels in a plurality of motion detection areas in a field and compares image data of each pixel with image data of its adjacent pixels to converts image data into gradient pattern information.

Figure 3:
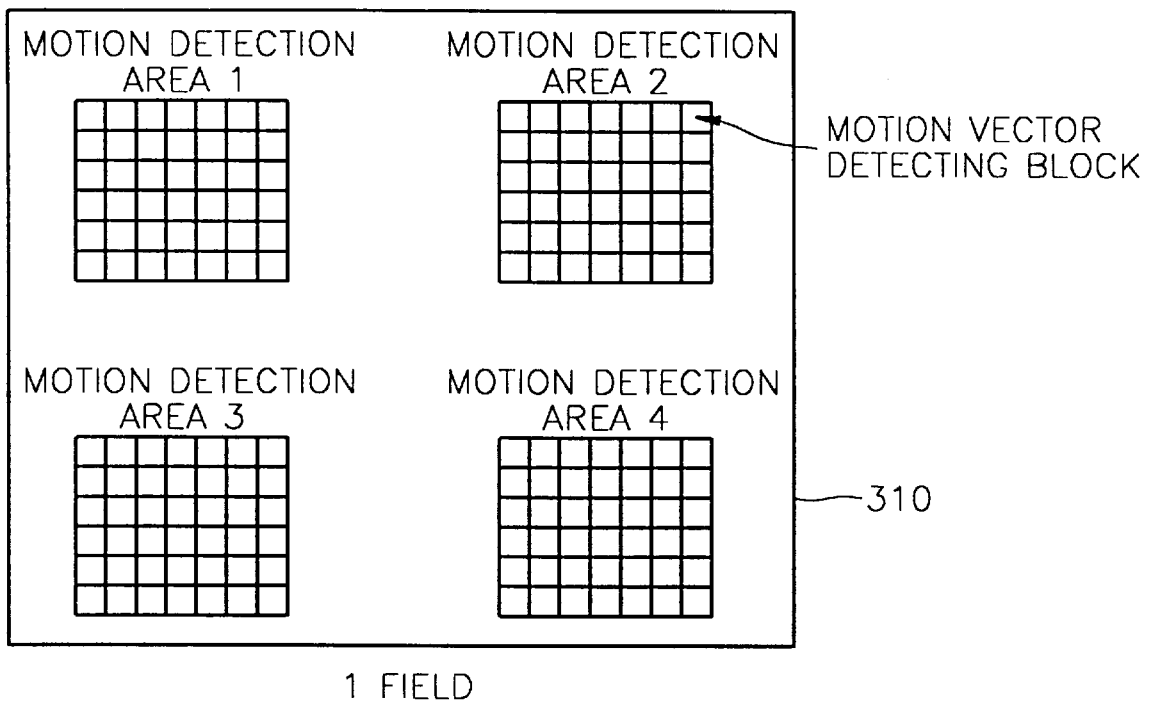
FIG. 3 shows an example of motion vector detection areas in one field of an image.
Figure 4:
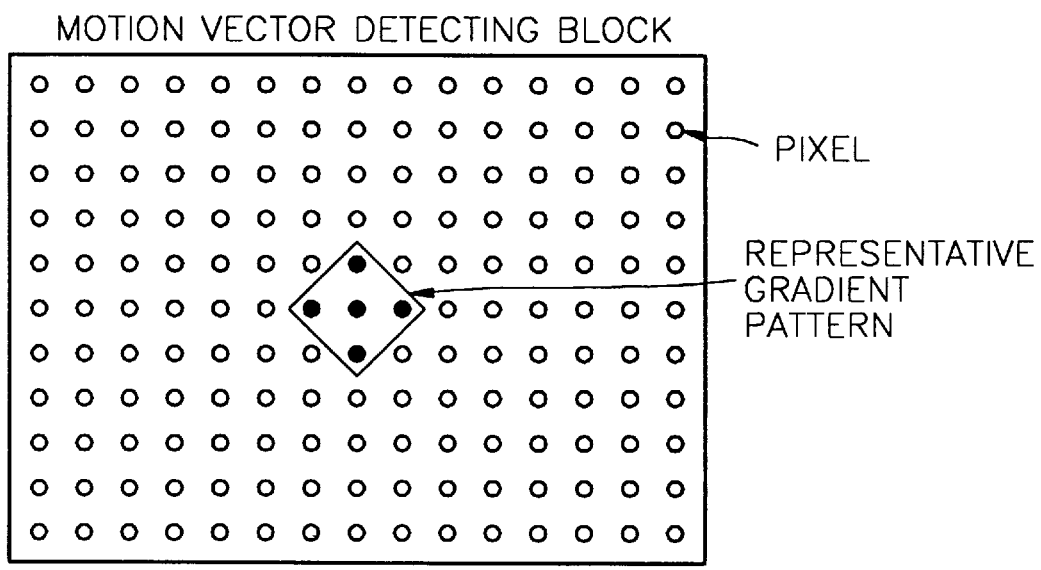
FIG. 4 shows an example of a gradient representative pattern in the present invention.

FIG. 3 shows an example of the motion vector detection areas in one field. Each of the motion vector detection areas is partitioned into plurality of motion vector detection blocks. FIG. 4 shows a gradient representative pattern in a motion vector detection block of FIG. 3, which is described below.

Figure 5:
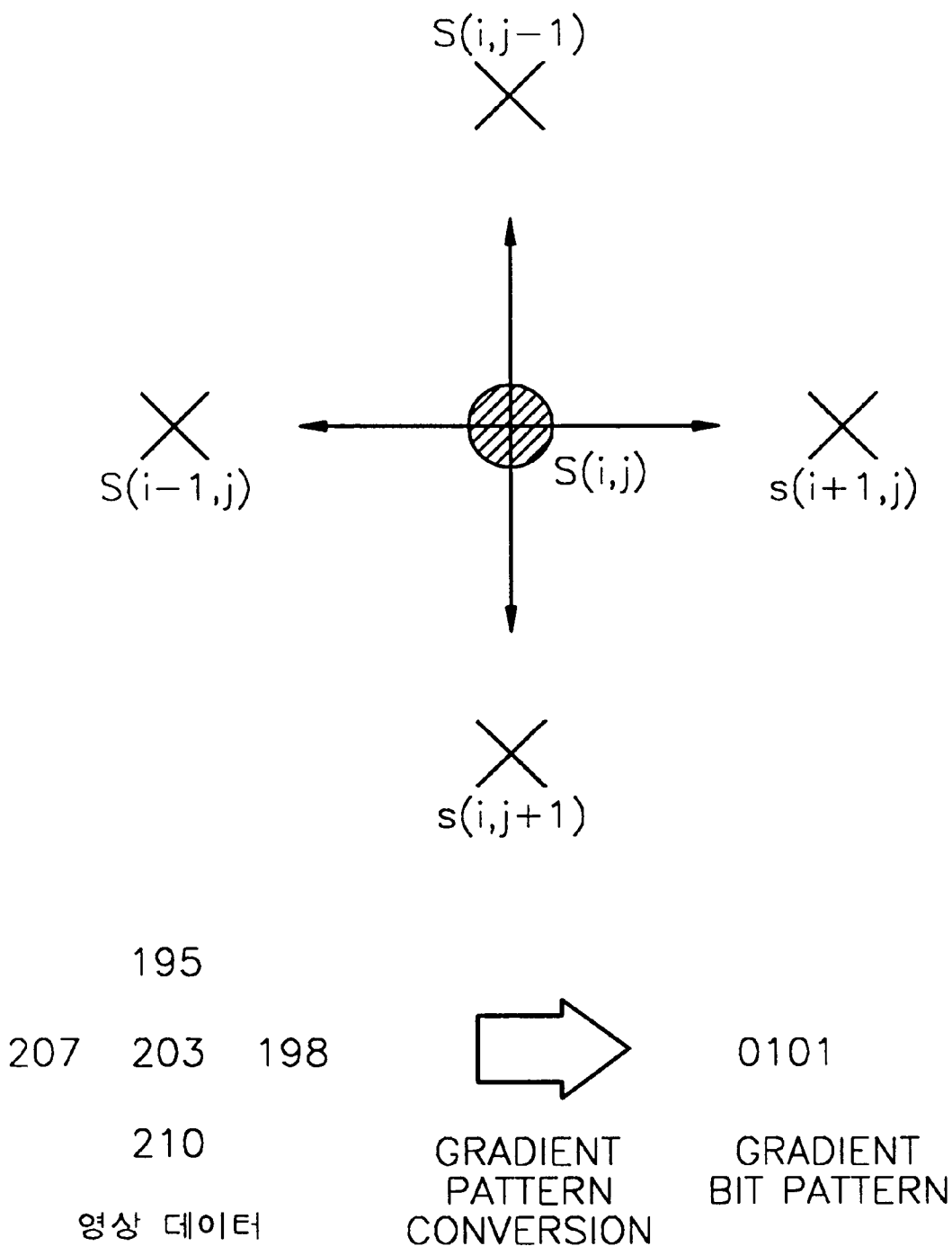
FIG. 5 shows an example of the gradient bit pattern conversion in the gradient pattern converter FIG. 2.

FIG. 5 shows an example of the gradient bit pattern conversion in the gradient pattern converter 210 of FIG. 2. When image data of each pixel consists of eight bits and represents one of 256 gray levels, the image data of each pixel is converted into gradient pattern data of four bits. As shown in FIG. 5, image data of an arbitrary pixel is denoted by $S(l, j)$ and data of adjacent pixels are denoted by $S(l, j-1)$, $S(l-1, j)$, $S(l, j+1)$, and $S(l+1, j)$.

In order to convert image data of a pixel into gradient pattern data, image data of the pixel is compared with that of pixels adjacent horizontally and vertically with the pixel as shown in Equation 1:

$$G_1 = S(i, j-1) - S(i, j) \quad (1)$$
$$G_2 = S(i-1, j) - S(i, j)$$
$$G_3 = S(i+1, j) - S(i, j)$$
$$G_4 = S(i, j+1) - S(i, j)$$

The gradient sizes $G_1$, $G_2$, $G_3$, and $G_4$ obtained by equation 1 are compared with a certain threshold value $T_g$ and are converted into gradient data bits $B^w$, $B^e$, $B^n$, and $B^s$ of the respective directions (west, east, north, and south).

$$B^w = \begin{cases} 1 & \text{if } G_1 > T_g \\ 0 & \text{otherwise} \end{cases} \quad (2)$$

$$B^e = \begin{cases} 1 & \text{if } G_2 > T_g \\ 0 & \text{otherwise} \end{cases}$$

$$B^n = \begin{cases} 1 & \text{if } G_3 > T_g \\ 0 & \text{otherwise} \end{cases}$$

$$B^s = \begin{cases} 1 & \text{if } G_4 > T_g \\ 0 & \text{otherwise} \end{cases}$$

That is, the gradient data bit is determined to be "1" if the difference between image data of a pixel and an adjacent pixel is greater than the threshold value, and "0" if the difference is not greater than the threshold value. The gradient data bits are four bits, each bit for each direction. It is possible to obtain pattern information reflecting the characteristic between a pixel and its four adjacent pixels.

Equations 3 and 4 shows an example of converting image data of a pixel into gradient pattern data.

$$S_0 = S(i, j) \quad (3)$$
$$S_1 = S(i+1, j)$$
$$S_2 = S(i-1, j)$$
$$S_3 = S(i, j-1)$$
$$S_4 = S(i, j+1)$$

$$(S_0 \quad S_1 \quad S_2 \quad S_3 \quad S_4) \rightarrow (B^w \quad B^e \quad B^n \quad B^s) \quad (4)$$
$$(203 \quad 198 \quad 207 \quad 195 \quad 210) \rightarrow (0 \quad 1 \quad 0 \quad 1)$$

Equation 3 shows an alternative notation of image data of a pixel $S(l, j)$ and its adjacent pixels for simplifying the expression. For example, when a gray level value of a pixel $S(l, j)$ is "203" and its adjacent pixels have gray levels of "198", "207", "195", and "210", respectively, the gray level value of the pixel $S(l, j)$ is converted into a bit pattern of "0101" by the gradient pattern converter 210.

Figure 6:
FIG. 6 shows another example of pixels used to convert image data of an arbitrary pixel into gradient pattern data in the present invention.
Figure 6:
Figure 6:
Figure 6:
Figure 6:
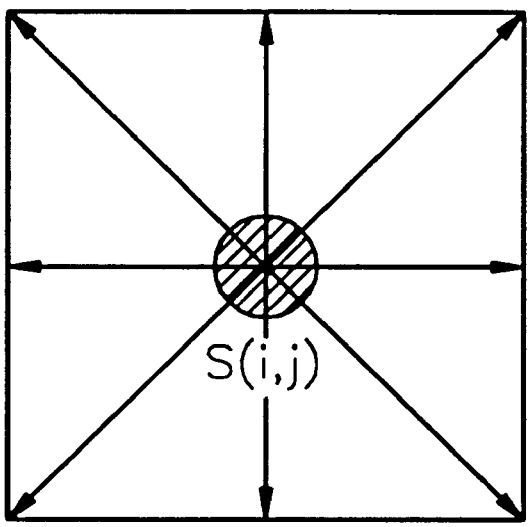
Figure 6:
Figure 6:
Figure 6:
Figure 6:

Meanwhile, in an alternative embodiment of the present invention, the gradient pattern converter 210 may convert a image data of an arbitrary pixel into gradient pattern information by use of image data of eight adjacent pixels $S(l, j-1)$, $S(l-1, j-1)$, $S(l-1, j)$, $S(l-1, j+1)$, $S(l, j+1)$, $S(l+1, j+1)$, $S(l+1, j)$, and $S(l+1, j-1)$, as shown in FIG. 6, in order to obtain a more precise motion vector. In such an embodiment, the gradient pattern conversion is performed by the same method as that of using four adjacent pixels adjacent to the pixel position $S(l, j)$. However, pattern information of eight bits is obtained. This means that the amount of gradient information obtained is doubled in this embodiment, as compared to the previously described embodiment.

The gradient representative pattern memory 220 stores only gradient representative pattern data among pattern data of a previous field output by the gradient pattern converter 210, so that the memory capacity is reduced. Namely, the representative pattern memory 220 stores only gradient representative pattern data, i.e. pattern data of 5 pixels in the present embodiment, for each motion vector detection block in each of the plurality of motion detection areas.

The correlation value detector 230 compares the gradient pattern of the current field output by the gradient pattern converter 210 with the gradient representative pattern of the previous field stored in the gradient pattern memory 220, and detects a correlation value. In order to detect the correlation value, the correlation value detector 230 generates sequentially a search window which has the same shape and size as the gradient representative pattern in each of the motion vector detection blocks and carries out gradient pattern matching operation between the search window and the gradient representative pattern of a corresponding motion vector detection block of the previous field. The gradient pattern matching operation is performed by a simple bit operation. That is, the gradient pattern matching operation is carried out by performing logic AND operations horizontally and vertically by use of the representative pattern bit ($B_{prev}^{w}$, $B_{prev}^{e}$, $B_{prev}^{n}$, $B_{prev}^{s}$) of the previous field and the pattern bit ($B_{curr}^{w}$, $B_{curr}^{e}$, $B_{curr}^{n}$, $B_{curr}^{s}$) of the current field and obtaining numbers of matched bits $MC_h$ and $MC_v$ in the horizontal and vertical directions, respectively, as follows:

$$MC_h = \begin{cases} 1 & \text{if } B_{prev}^{w} = B_{curr}^{w}, B_{prev}^{e} = B_{curr}^{e} \\ 0 & \text{otherwise} \end{cases} \quad (5)$$

$$MC_v = \begin{cases} 1 & \text{if } B_{prev}^{n} = B_{curr}^{n}, B_{prev}^{s} = B_{curr}^{s} \\ 0 & \text{otherwise} \end{cases}$$

The correlation value accumulator 240 accumulates the correlation values of pixels in the search window output by the correlation value detector 230 as described by a following equation:

$$ACC(i, j) = \sum_i \sum_j MC_h(i, j) + MC_v(i, j), \quad (6)$$
$$-N \le i \le N, -M \le j \le M$$

At this time, the accumulated correlation value has a different value with the change of position of the search window and reflects the matched level between the search window and the gradient representative pattern of the previous field. A largest accumulated value results from a position where matching is performed well.

The maximum value coordinate extractor 250 extracts a coordinate of the search window at which the accumulated correlation value from the correlation value accumulator 240 has its maximum value. The maximum value coordinate extractor 250 determines the difference between the coordinate of the search window resulting the maximum accumulated correlation value and the coordinate of the gradient representative pattern as the area motion vector. That is, the position (l, j) where the accumulated value ACC(l, j) has the maximum value is determined to be the amount of movement with respect to an motion detection block, as described by a following equation:

$$(i,j) = arg_{ij}^{max}[ACC(i,j)] \quad (7)$$

The maximum value coordinate extractor 250 determines a motion vector with respect to a motion vector detecting area by averaging motion vectors with respect to motion vector detecting blocks in the motion vector detecting area. The average value of the motion vectors with respect to motion vector detecting blocks is obtained by adding the motion vectors with respect to motion vector detecting blocks and normalizing an added vector. Meanwhile, in an alternative embodiment of the present invention, a zero vector or a vector different from other vectors obviously may be excluded in the calculation of the average value.

Finally, the maximum value coordinate extractor 250 determines a motion vector with respect to a field by averaging motion vectors with respect to motion vector detecting areas. The motion vector with respect to the field is obtained by adding the motion vectors with respect to motion vector detecting areas and normalizing an added vector. In an alternative embodiment of the present invention, some of the vectors determined under certain criterion may be excluded in the calculation of motion vector with respect to the field.

Figure 7:
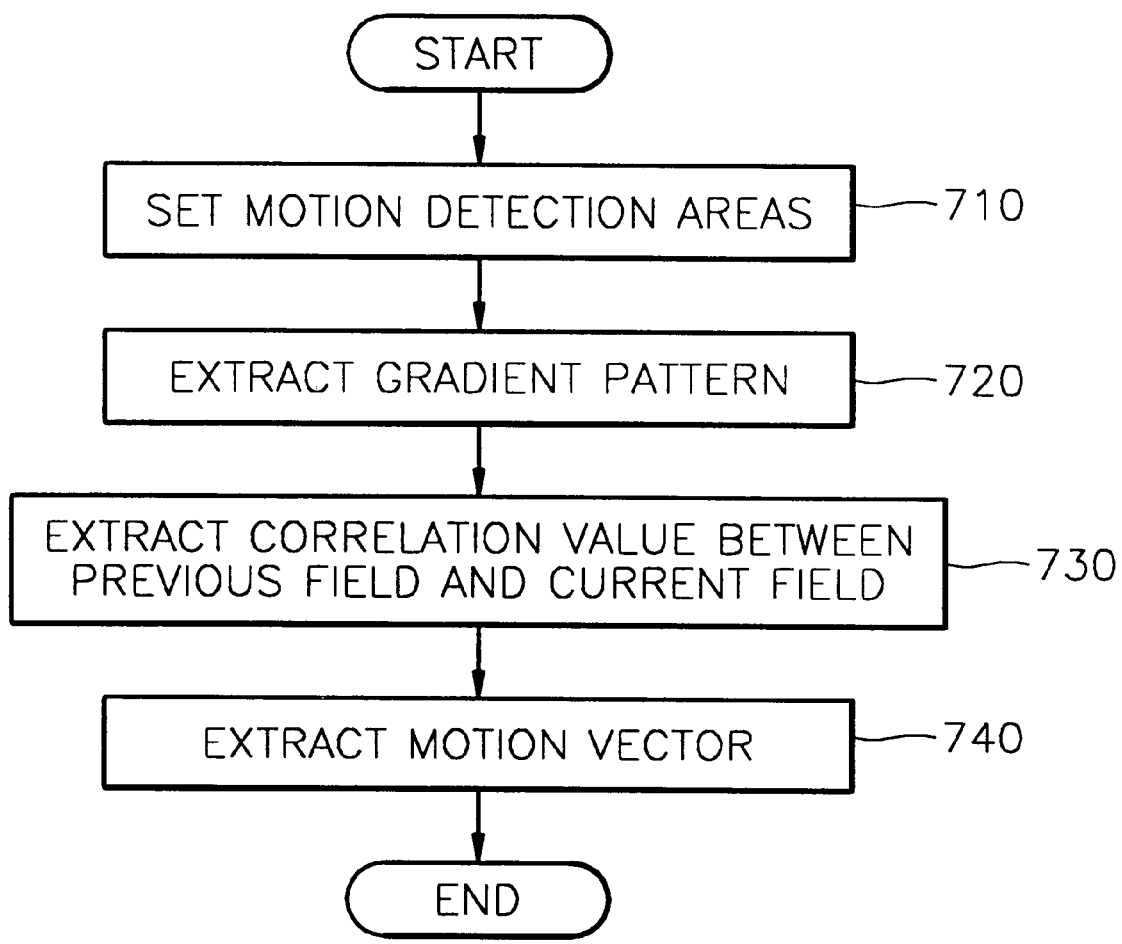
FIG. 7 is a flowchart showing a motion detecting method according to the present invention.

FIG. 7 is a flowchart showing a method for detecting the motion of an image according to the present invention.

A motion detection area is set in the image in step 710. In step 720, gradient pattern data of each pixel in a predetermined motion detection area is extracted by comparing the pixel with its adjacent pixels. Afterwards, pattern matching is performed between the gradient representative pattern of a previous field and the gradient pattern of a current field in step 730, while obtaining a correlation value between each search window and the gradient representative pattern of a previous field. The motion vector is determined from a difference between a position of search window which results in a largest accumulated correlation value and a position of the gradient representative pattern in step 740.

As described above, according to the present invention, it is possible to reduce the required memory capacity of the memory by converting input data into gradient pattern information and detecting motion vectors due to shaking of the hands by using the gradient pattern information.

Although the present invention has been described in terms of preferred embodiments, it will be understood by those of skill in the art that various changes and modifications may be made to the described embodiments without departing from the spirit and scope of the invention.

This application is based on Korean Patent Application No. 97-52121, which is incorporated herein by reference for all purposes.

What is claimed is:

1. An apparatus for detecting a motion of an image, comprising:
    a gradient pattern converter for converting a gray level of each pixel in a motion detection area in an input image into a gradient bit pattern by comparing differences between the gray level of the pixel and gray levels of its adjacent pixels with an arbitrary threshold value; and
    a motion vector detector for forming a search area sequentially in the motion detection area, comparing a gradient bit pattern of the search area with a representative bit pattern of a previous image to calculate and accumulate correlation values, and determining a difference of coordinates of a search area which results in a maximum correlation value and coordinates of the representative bit pattern as a motion vector.

2. The apparatus of claim 1, wherein said gradient pattern converter calculates the differences between the gray level of the pixel and gray levels of four adjacent pixels.

3. The apparatus of claim 1, wherein said gradient pattern converter calculates the differences between the gray level of the pixel and gray levels of eight adjacent pixels.

4. An apparatus for detecting a motion of an image comprising:
    a gradient pattern converter for converting a gray level of each pixel in a motion detection area in an input image into a gradient bit pattern by comparing differences between the gray level of the pixel and gray levels of its adjacent pixels with an arbitrary threshold value; and
    a motion vector detector for forming a search area sequentially in the motion detection area, comparing a gradient bit pattern of the search area with a representative bit pattern of a previous image to calculate and accumulate correlation values, and determining a difference of coordinates of a search area which results in a maximum correlation value and coordinates of the representative bit pattern as a motion vector;
wherein said motion vector detector comprises:
    a representative pattern memory for storing the representative bit pattern of the previous image;

a correlation value detector for performing bit pattern matching operation between the representative bit pattern of the previous image stored in said representative pattern memory and the bit pattern of a current image to calculate a correlation value for each pixel in each search area;

a correlation value accumulator for accumulating correlation values from said correlation value detector to output a accumulated correlation value in a unit of the search area; and a maximum value detector for detecting the coordinates of the search area resulting in the maximum value among the accumulated correlation values from said correlation value accumulator.

5. The apparatus of claim 4, wherein said correlation value detector is an AND operator for performing AND operations with respect to the representative bit pattern of the previous image the bit pattern in the search area in the current image.

6. The apparatus of claim 4, wherein the correlation value is a number of matched bits between the bit pattern of the search area of the current image and the representative bit pattern of the previous image.

7. The apparatus of claim 6, wherein a the number of the matched bits $MC_h$ and $MC_v$ in the horizontal and the vertical directions, respectively, are calculated by:

$$MC_h = \begin{cases} 1 & \text{if } B^w_{prev} = B^w_{curr}, B^e_{prev} = B^e_{curr} \\ 0 & \text{otherwise} \end{cases} \quad (8)$$

$$MC_v = \begin{cases} 1 & \text{if } B^n_{prev} = B^n_{curr}, B^s_{prev} = B^s_{curr} \\ 0 & \text{otherwise} \end{cases}$$

wherein, $(B^w_{prev}, B^e_{prev}, B^n_{prev}, B^s_{prev})$ are the representative bit pattern of the previous image and $(B^w_{curr}, B^e_{curr}, B^n_{curr}, B^s_{curr})$ are the bit pattern of the search area of the current image.

8. The apparatus of claim 7, wherein the accumulated correlation value ACC (l, j) is calculated by:

$$ACC(i, j) = \sum_i \sum_j MC_h(i, j) + MC_v(i, j),$$

$$-N \leq i \leq N, -M \leq j \leq M.$$

9. A method for detecting a motion of an image, comprising the steps of:

(a) setting a motion detection area in an input image;

(b) comparing a gray level of each pixel in the motion detection area with gray levels of its adjacent pixels to extract a gradient bit pattern;

(c) performing bit pattern matching between a bit pattern of a current image and a representative bit pattern of a previous image to obtain a correlation value in a unit of a predetermined search area which has the same shape and magnitude of the representative bit pattern; and (d) determining a difference of coordinates of a search area which results in a maximum correlation value and coordinates of the representative bit pattern as a motion vector.

* * * * *